Patented Sept. 5, 1939

2,171,963

UNITED STATES PATENT OFFICE 2,171,963

CONDENSATION PRODUCT AND AQUEOUS SOLUTION THEREOF

Ernst Koch and Christoph Thomsen, Frankfort-on-the-Main-Hochst, and Karl Dachlauer, Hofheim in Taunus, Germany, assignors to I. G. Farbenindustrie Aktiengesellschaft, Frankfort-on-the-Main, Germany No Drawing. Application October 16, 1936, Serial No. 106,064. In Germany October 18, 1935

13 Claims. (Cl. 260—25)

The present invention relates to condensation products and to aqueous solutions thereof.

We have found that condensation products of natural resins and aromatic compounds containing phenolic hydroxyl may be transformed into watersoluble products by introducing into them sulfomethyl groups. The watersoluble bodies thus obtained may be used as tanning agents, adjuvants in the textile industry and the like purposes.

The condensation products may be prepared from natural resins and aromatic compounds containing phenolic hydroxyl alone, but it is also possible to add before or during the condensation bodies containing OH-groups or NH$_2$-groups which react with one of the two components or with the condensation product itself or react only when the sulfomethyl groups are introduced. Substances of this kind are, for instance, urea, aniline, lignin, phenol resins and others.

As natural resins there may be used: colophony, pine resin, tree resin and Swedish resin. As aromatic compounds containing hydroxyl there may be named phenol, cresol, resorcinol, salicylic acid, cresotinic acid, naphthol, dihydroxydiphenyl sulfone, dihydroxydiphenyl methane and mixtures of these compounds, such as crude cresol, creosote oil and others.

The said substances may be condensed in the presence or absence of solvents or diluents. As a rule it may be advisable to add condensing agents, such as sulfuric acid or phosphoric acid; this process may be performed according to the statements of United States Patent No. 1,788,371. The condensation products thus obtained are then caused to react with formaldehyde and sulphurous acid or salts thereof, such as sodium sulfite, potassium sulfite; in this case the group —CH$_2$SO$_3$X, X being hydrogen, an alkali metal or ammonium, probably enters into the phenol nucleus.

The products obtained are yellow to brown, viscid to solid substances. They are readily soluble in water as well as in acids and alkalies of not too high a concentration. The solutions foam, even in an alkaline or acid liquor. In an acid condition the products obtained are excellent tanning agents. The leather treated with these agents is light colored and full bodied and has an excellent fastness to light so far as the tanning agents have been made without application of lignin. The products may be used as tanning agents alone or in combination with other tanning agents.

The following examples serve to illustrate the invention, but they are not intended to limit it thereto, the parts being by weight:

1. 300 parts of colophony and 150 parts of phenol are fused and after the addition of 15 parts of sulfuric acid of 75 per cent. strength the fused mass is heated for 8 hours to 70° C. to 80° C. The melt is then mixed, at 50° C. to 60° C., with 300 parts of sodium sulfite and within one hour 500 parts of formaldehyde solution of 30 per cent. strength are caused to run in. After having stirred for one hour at a temperature of 95° C. the product is soluble in water to a clear solution and after a stirring for 8 hours it is soluble in sulfuric acid of 15 per cent. strength. Calf skin tanned in the usual manner with the solution of the product acidified with sulfuric acid, yields a light, yellow excellent plump leather.

2. 300 parts of crude cresol and 300 parts of colophony are heated together with 10 parts of phosphoric acid of 80 per cent. strength, for 8 hours to 120° C. to 125° C. 250 parts of sodium sulfite and 400 parts of formaldehyde solution of 30 per cent. strength are then added to the mixture and the whole is heated at 100° C. until the product is soluble in sulfuric acid of 20 per cent. strength to a clear solution. Cow hide tanned with a solution of this product acidified with sulfuric acid and oxalic acid to a pH-value of 3.8, yields a light leather of a good firmness and solidity.

3. 200 parts of colophony are fused together with 200 parts of cresol and 30 parts of sulfuric acid of 60 per cent. strength are then added to the fused mass. The melt is heated for 8 hours to 120° C. to 125° C. 150 parts of hydrochloric acid lignin are then added in several portions and the whole is stirred for further 8 hours at 120° C. 400 parts of sodium sulfite are then added and at the same time 500 parts of formaldehyde solution of 30 per cent. strength are caused to run in. Stirring is continued at 110° C. to 115° C. until the product has become soluble in water. Calf skin tanned with a solution of this product acidified with oxalic acid to a pH-value of 4.5 yields a light brown plump leather.

4. 400 parts of balsamic resin and 200 parts of crude cresol are heated for one hour to 70° C. to 80° C. 40 parts of sulfuric acid monohydrate are then added and the whole is heated for 12 hours to 70° C. to 80° C. The whole is mixed with 400 parts of sodium sulfite and 500 parts of formaldehyde solution of 30 per cent. strength are caused to run in. After heating for 3 hours to 95° C. the whole becomes soluble in water and after heating for 6 hours it becomes soluble in sulfuric acid of 10 per cent. strength.

The product which has been acidified is suitable for tanning and for imparting a non-slip finish to rayon fabrics.

According to the starting material used, the kind of resin or the hydroxyl-aryl compound or the quantitative proportion of the various components, the required quantities of for instance sodium sulfite and formaldehyde vary.

By acidifying an aqueous solution of the products obtainable in any of the examples and salting out, the corresponding free acid of the properties described above is obtained. By salting out the solution the corresponding alkaline salt, for instance the sodium salt or potassium salt, is obtained, which shows the same properties but has no tanning action.

We claim:

1. Improved product obtained by condensing a natural resin with an aromatic compound containing phenolic hydroxyl, said improved condensation product being characterized by containing in its molecule the group —$CH_2$—$SO_3x$, wherein $x$ stands for a monovalent substituent of the group consisting of hydrogen, an alkali metal and ammonium, and being further characterized by being a viscid to solid substance soluble in water.

2. Improved product obtained by condensing a natural resin with an aromatic compound containing phenolic hydroxyl, said improved product being characterized by containing in its molecule the group —$CH_2$—$SO_3H$, by being soluble in water, and by showing a tanning effect upon skin.

3. The improved product defined by claim 1, in which the aromatic compound containing a phenolic hydroxyl is a phenol.

4. The improved product defined by claim 1, in which the aromatic compound containing a phenolic hydroxyl is crude cresol.

5. The improved product defined by claim 1, in which the natural resin is colophony.

6. The improved product defined by claim 1, in which the natural resin is balsamic resin.

7. The improved product defined by claim 1, in which the natural resin is colophony and the aromatic compound containing phenolic hydroxyl is crude cresol.

8. As tanning agents the acidified aqueous solutions of condensation products of natural resins with aromatic compounds containing phenolic hydroxyl, said condensation products containing the group —$CH_2$—$SO_3X$, X standing for hydrogen, an alkali metal or ammonium.

9. As tanning agents the acidified aqueous solutions of condensation products of natural resins with aromatic compounds containing phenolic hydroxyl, said condensation products containing the group —$CH_2$—$SO_3H$.

10. As tanning agents the acidified aqueous solutions of condensation products of natural resins with phenols, said condensation products containing the group —$CH_2$—$SO_3H$.

11. As tanning agent the acidified aqueous solution of the condensation product of colophony with phenol, said product containing the group —$CH_2$—$SO_3H$.

12. As tanning agent the acidified aqueous solution of the condensation product of colophony with crude cresol, said product containing the group —$CH_2$—$SO_3H$.

13. As tanning agent the acidified aqueous solution of the condensation product of balsamic resin with crude cresol, said product containing the group —$CH_2$—$SO_3H$.

ERNST KOCH.
CHRISTOPH THOMSEN.
KARL DACHLAUER.